(12) United States Patent
Lee et al.

(10) Patent No.: US 8,427,607 B2
(45) Date of Patent: Apr. 23, 2013

(54) ARRAY SUBSTRATE FOR TRANSFLECTIVE LIQUID CRYSTAL DISPLAY DEVICE AND METHOD OF FABRICATING THE SAME

(75) Inventors: Joon-Dong Lee, Annyang-si (KR); Ki-Bok Park, Seoul (KR); Won-Ho Lee, Paju-si (KR)

(73) Assignee: LG Display Co. Ltd., Seoul (KR)

( * ) Notice: Subject to any disclaimer, the term of this patent is extended or adjusted under 35 U.S.C. 154(b) by 627 days.

(21) Appl. No.: 12/628,719

(22) Filed: Dec. 1, 2009

(65) Prior Publication Data
US 2010/0141879 A1 Jun. 10, 2010

(30) Foreign Application Priority Data
Dec. 4, 2008 (KR) .................. 10-2008-0122523

(51) Int. Cl.
G02F 1/1335 (2006.01)
G02F 1/1343 (2006.01)

(52) U.S. Cl.
USPC .......................... 349/114; 349/141

(58) Field of Classification Search .............. 349/114, 349/141
See application file for complete search history.

(56) References Cited

U.S. PATENT DOCUMENTS

| 7,408,608 | B2* | 8/2008 | Lee | 349/141 |
| 7,466,383 | B2* | 12/2008 | Lee et al. | 349/128 |
| 7,609,344 | B2* | 10/2009 | Chang et al. | 349/114 |
| 7,683,998 | B2* | 3/2010 | Lee | 349/141 |
| 7,705,937 | B2* | 4/2010 | Sakamoto et al. | 349/114 |
| 8,164,720 | B2* | 4/2012 | Adachi et al. | 349/114 |

* cited by examiner

Primary Examiner — Huyen Ngo
(74) Attorney, Agent, or Firm — Brinks Hofer Gilson & Lione

(57) ABSTRACT

An array substrate for a transflective liquid crystal display device comprising a common electrode over a third passivation layer substantially all over a substrate, the common electrode having first openings and second openings corresponding to a transmissive area and a reflective area, respectively, wherein the first openings are spaced apart from each other and are parallel to a data line, and the second openings are spaced apart from each other and are slant at a predetermined angle with respect to the data line, wherein first ends of the first openings overlap a second gate line, second ends of the first openings overlap the common line, first ends of the second openings overlap the common line, and second ends of the second openings overlap a first gate line.

11 Claims, 5 Drawing Sheets

Related Art

ARRAY SUBSTRATE FOR TRANSFLECTIVE LIQUID CRYSTAL DISPLAY DEVICE AND METHOD OF FABRICATING THE SAME

RELATED APPLICATIONS

This application claims the benefit of Korean Patent Application No. 2008-0122523, filed on Dec. 4, 2008, which is hereby incorporated by reference in its entirety.

BACKGROUND

1. Field of the Disclosure

The present disclosure relates to a liquid crystal display (LCD) device, and more particularly, to an array substrate for a transflective liquid crystal display device and a method of fabricating the same.

2. Discussion of the Related Art

With rapid development of information technologies, display devices for displaying the information have been actively proposed and developed. More particularly, flat panel display (FPD) devices having a thin profile, light weight and low power consumption have been actively pursued. FPD devices can be classified into an emissive type and a non-emissive type depending on their light emission capability. In an emissive type FPD device, an image is displayed using light that emanates from the FPD device. In a non-emissive type FPD device, an image is displayed using light from an external source that reflects and/or transmits through the FPD. For example, a plasma display panel (PDP) device and a field emission display (FED) device are an emissive type. In another example, an electroluminescent display (ELD) device is an emissive type FPD device. Unlike a PDP and an ELD, a liquid crystal display (LCD) device is a non-emissive type FPD device that uses a backlight as a light source.

Among the various types of FPD devices, liquid crystal display (LCD) devices have been widely used as monitors for notebook computers and desktop computers because of their high resolution, color rendering capability and superiority in displaying moving images. The LCD device displays images by controlling a transmittance of light through the device. More particularly, liquid crystal molecules of a liquid crystal interposed between two substrates facing each other control light transmission in response to an electric field generated between electrodes on the substrates.

Because the LCD device does not emit light, the LCD device needs a separate light source. Thus, a backlight is disposed on the rear surface on a liquid crystal panel of the LCD device, and images are displayed with the light emitted from the backlight and transmitted through the liquid crystal panel. Accordingly, the above-mentioned LCD device is referred to as a transmission type LCD device. The transmission type LCD device can display bright images in a dark environment due to the use of a separate light source, such as a backlight, but may result in large power consumption because of the use of the backlight.

To solve the problem of the large power consumption, a reflection type LCD device has been developed. The reflection type LCD device controls a transmittance of light by reflecting the outside natural light or artificial light through a liquid crystal layer. In a reflection type LCD device, a pixel electrode on a lower substrate is formed of a conductive material having a relatively high reflectivity and a common electrode on an upper substrate is formed of a transparent conductive material. Although the reflection type LCD device may have lower power consumption than the transmission type LCD device, it may have low brightness when the outside light is insufficient or weak.

To solve both the problems of the large power consumption and the low brightness, a transflective LCD device combining the capabilities of a transmission type LCD device and reflection type LCD device has been suggested. The transflective LCD device can select a transmission mode using a backlight while in an indoor environment or a circumstance having no external light source, and a reflection mode using an external light source in an environment where the external light source exists.

FIG. 1 is a plan view of an array substrate for a transflective LCD device according to the related art. In FIG. 1, a gate line 5 and a data line 30 are formed to cross each other and define a pixel region P. A common line 6 is formed across the pixel region P and parallel to the gate line 5. The pixel region P is divided into a reflective area RA and a transmissive area TA by the common line 6.

A thin film transistor Tr is formed in the pixel region P as a switching element and is connected to the gate line 5 and the data line 30. The thin film transistor Tr includes a gate electrode 8, a gate insulating layer (not shown), a semiconductor layer 20, and source and drain electrodes 33 and 36. The source and drain electrodes 33 and 36 are spaced apart from each other. A pixel electrode 62 is formed in the pixel region P and contacts the drain electrode 36 of the thin film transistor Tr. The pixel electrode 62 has substantially a plate shape and includes bar-shaped first openings op1 and second openings op2 in the transmissive area TA and the reflective area RA, respectively. The bar-shaped first openings op1 and second openings op2 are formed along different directions, that is, the first and second openings op1 and op2 have different length directions, which are directions of their lengths longer than widths. More particularly, the first openings op1 in the transmissive area TA are formed parallel to the data line 30, and the second openings op2 in the reflective area RA are formed aslant at a predetermined angle with respect to the data line 30. The pixel electrode 62 in the pixel region P is separated from a pixel electrode in a next pixel region.

Although not shown in the figure, a common electrode is formed in the pixel region P, and the common electrode has a size corresponding to the pixel region P. The common electrode in the pixel region P is connected to a common electrode in a next pixel region, and the common electrodes are electrically connected to each other all over the array substrate 1. An insulating layer (not shown) is formed between the common electrode and the pixel electrode 62. Therefore, a fringe electric field is induced between the common electrode and the pixel electrode 62 spaced apart from each other with the insulating layer interposed therebetween.

Further, a reflective layer (not shown) is formed in the reflective area RA so that the device operates as a reflection mode. The reflective layer is formed of a metallic material having relatively high reflectivity.

In the transflective LCD device including the array substrate 1, there occurs disclination adjacent to the data line 30 in the reflective area RA, and relatively dark portions are irregularly shown. This causes non-uniform brightness, and thus image qualities are lowered. The disclination is caused by liquid crystal molecules arranged disorderly, and the disclination mainly occurs around ends of the first and second openings op1 and op2 for inducing the fringe electric field.

Moreover, in the array substrate 1, since the ends of the second openings op2 in the reflective area RA are disposed in the pixel region P, the disclination seriously occurs, as shown in FIG. 2, which shows a simulating result about the reflective area of the pixel region according to the related art. To prevent the lowering of the image qualities due to the disclination, a black matrix on a color filter substrate opposite to the array substrate 1 should have a widened width to cover the data line 30 and the portions where the disclination occurs. Therefore, the aperture ratio is decreased.

The pixel electrode 62 receives signal voltages, which vary at any time, from the data line 30. Therefore, it is desirable that the pixel electrode 62 does not overlap the data line 30, and the ends of the second openings op2 are spaced apart from the data line 30. Accordingly, in the array substrate 1, it is hard to prevent the lowering of the image qualities without the decrease of the aperture ratio in the reflective area RA.

SUMMARY

An array substrate for a transflective liquid crystal display device includes a substrate, first and second gate lines on the substrate along a first direction, a common line parallel to and between the first and second gate lines, a gate electrode connected to the first gate line, a gate insulating layer on the first and second gate lines, the gate electrode and the common line, a data line over the gate insulating layer and along a second direction, the data line crossing the first and second gate lines to define a pixel region, the pixel region divided into a transmissive area and a reflective area by the common line, a semiconductor layer on the gate insulating layer over the gate electrode, source and drain electrodes over the semiconductor layer and spaced apart each other, a first passivation layer over the data line, the source electrode and the drain electrode substantially all over the substrate, a reflective layer over the first passivation layer in the reflective area, a second passivation layer over the reflective layer and having a flat top surface in the reflective layer, a pixel electrode over the first and second passivation layers and connected to the drain electrode through a drain contact hole, the pixel electrode having a plate shape, a third passivation layer over the pixel electrode, and a common electrode over the third passivation layer substantially all over the substrate, the common electrode having first openings and second openings corresponding to the transmissive area and the reflective area, respectively, wherein the first openings are spaced apart from each other and are parallel to the data line, and the second openings are spaced apart from each other and are slant an a predetermined angle with respect to the data line, wherein first ends of the first openings overlap the second gate line, second ends of the first openings overlap the common line, first ends of the second openings overlap the common line, and second ends of the second openings overlap the first gate line.

In another aspect, a method of fabricating an array substrate for a transflective liquid crystal display device includes forming first and second gate lines on a substrate along a first direction, forming a common line parallel to and between the first and second gate lines, forming a gate electrode connected to the first gate line, forming a gate insulating layer on the first and second gate lines, the gate electrode and the common line, forming a data line over the gate insulating layer and along a second direction, the data line crossing the first and second gate lines to define a pixel region, the pixel region divided into a transmissive area and a reflective area by the common line, forming a semiconductor layer on the gate insulating layer over the gate electrode, forming source and drain electrodes over the semiconductor layer and spaced apart each other, forming a first passivation layer over the data line, the source electrode and the drain electrode substantially all over the substrate, forming a reflective layer over the first passivation layer in the reflective area, forming a second passivation layer over the reflective layer and having a flat top surface in the reflective layer, forming a pixel electrode over the first and second passivation layers and connected to the drain electrode through a drain contact hole, the pixel electrode having a plate shape, forming a third passivation layer over the pixel electrode, and forming a common electrode over the third passivation layer substantially all over the substrate, the common electrode having first openings and second openings corresponding to the transmissive area and the reflective area, respectively, wherein the first openings are spaced apart from each other and are parallel to the data line, and the second openings are spaced apart from each other and are slant an a predetermined angle with respect to the data line, wherein first ends of the first openings overlap the second gate line, second ends of the first openings overlap the common line, first ends of the second openings overlap the common line, and second ends of the second openings overlap the first gate line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 3:
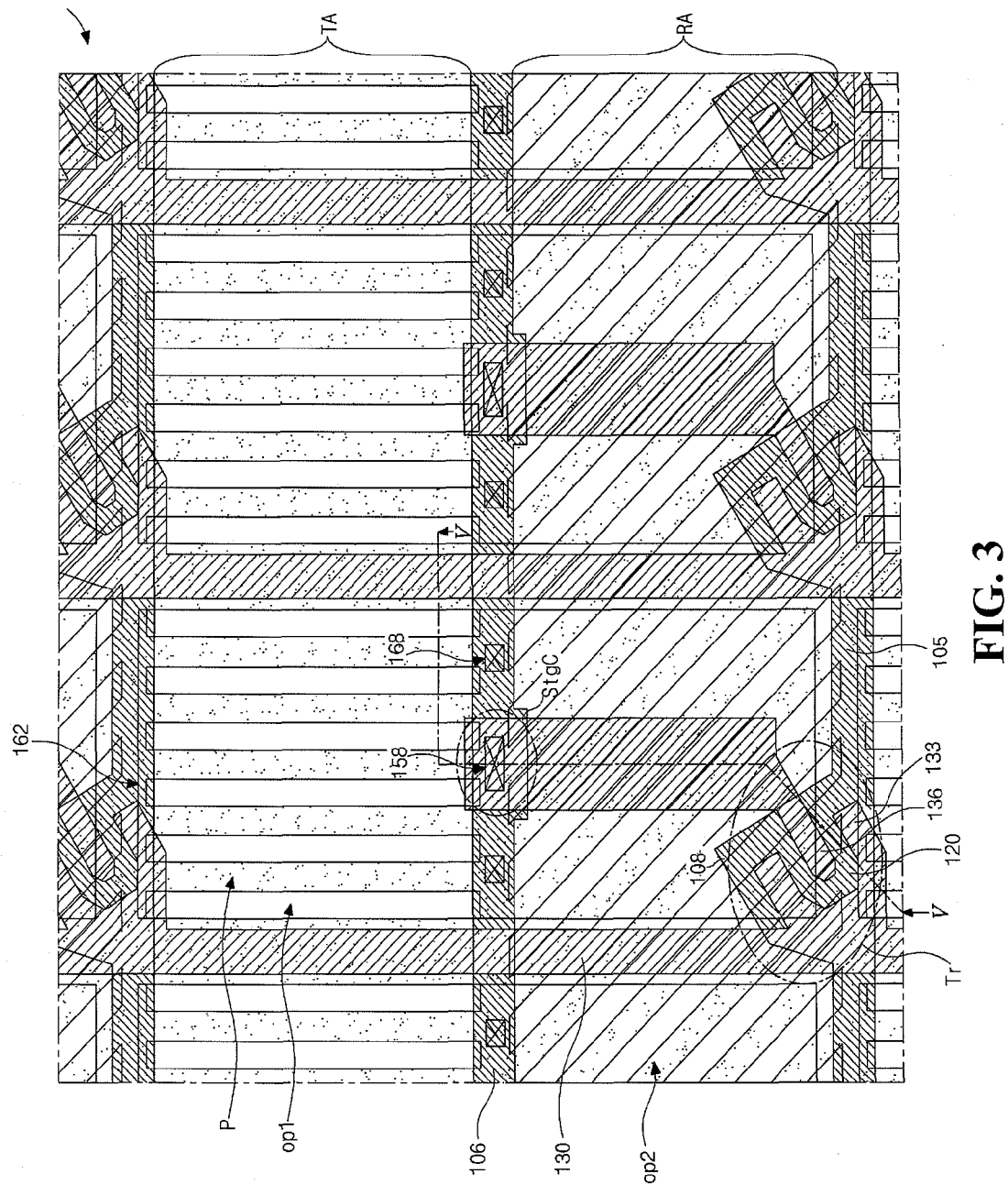
FIG. 3 is a plan view of an array substrate for a transflective LCD device according to an exemplary embodiment of the present invention.

FIG. 3 is a plan view of an array substrate for a transflective LCD device according to an exemplary embodiment of the present invention. FIG. 3 shows two pixel regions.

As shown in FIG. 3, a gate line 105 and a data line 130 are formed on a substrate. The gate line 105 and the data line 130 cross each other, to thereby define a pixel region P. A common line 106 is formed across the pixel region P and parallel to the gate line 105. The pixel region P is divided into a reflective area RA and a transmissive area TA by the common line 106.

A thin film transistor Tr is formed in the pixel region P, more particularly, in the reflective area RA, as a switching element and is connected to the gate line 105 and the data line 130. The thin film transistor Tr includes a gate electrode 108, a gate insulating layer (not shown), a semiconductor layer 120, and source and drain electrodes 133 and 136. The source and drain electrodes 133 and 136 are spaced apart from each other. The drain electrode 136 extends into the reflective area RA, and an end of the drain electrode 136 overlaps the common line 106. The overlapped drain electrode 136 and common line 106 constitute a storage capacitor StgC with an insulating layer (not shown) interposed therebetween.

A pixel electrode 162 is formed in the pixel region P and contacts the drain electrode 136 of the thin film transistor Tr. The pixel electrode 162 has substantially a plate shape and a size corresponding to the pixel region P.

A common electrode (not shown) is formed substantially all over the substrate, and more particularly, all over a display area of the substrate including the pixel regions. The common electrode is connected to the common line 106 through common contact holes 168. Even though the common contact holes 168 are formed in the pixel region P in the figure, as an example, the common contact holes 168 may be formed in a non-display area of the substrate, where ends of the common line 106 are disposed.

The common electrode includes bar-shaped first openings op1 and second openings op2 corresponding to the transmissive area TA and the reflective area RA, respectively. The first openings op1 corresponding to the transmissive area TA are formed parallel to the data line 130. One ends of the first openings op1 overlap another gate line 105, and the other ends of the first openings op1 overlap the common line 106. The second openings op2 corresponding to the reflective area RA are formed aslant at a predetermined angle with respect to the data line 130, beneficially, at an angle of 30 degrees to 60 degrees. The second openings op2 are straight bar-shaped regardless of the pixel regions P adjacent to each other horizontally in the context of the figure. Parts of the second openings op2 overlapping the data line 130 are slant at the predetermined angle with respect to the data line 130. Some of the second openings op2 may be disposed in the reflective areas RA of the pixel region P and a next pixel region adjacent to the pixel region P horizontally in the context of the figure. One ends of the second openings op2 overlap the common line 106, and the other ends of the second openings op2 overlap the gate line 106.

Figure 1:
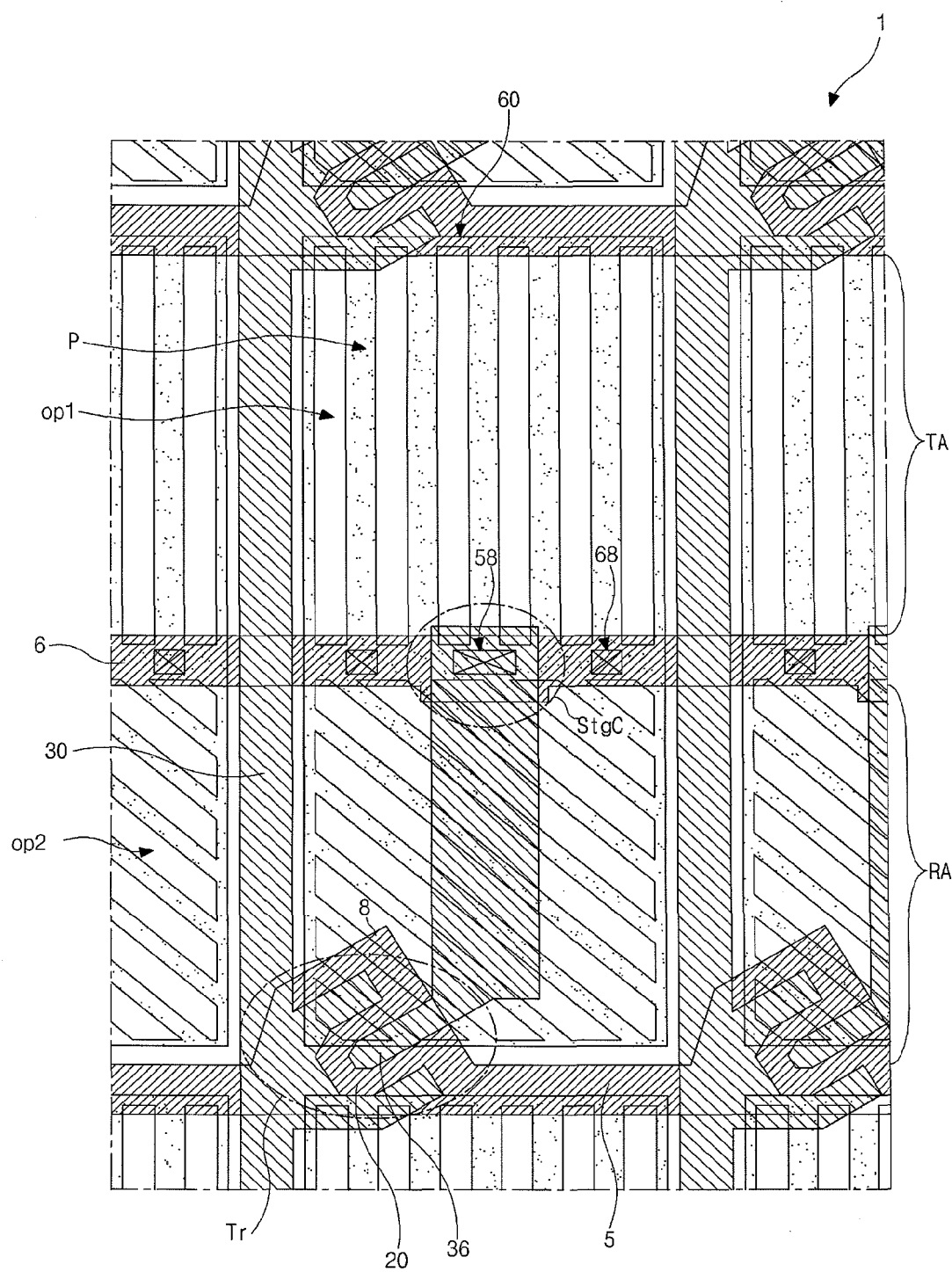
FIG. 1 is a plan view of an array substrate for a transflective LCD device according to the related art.
Figure 2:
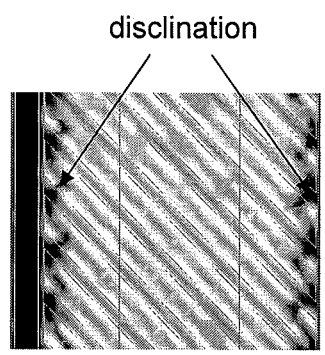
FIG. 2 is a view of showing a simulating result about a reflective area of a pixel region of the transflective LCD device according to the related art.

In the present invention, the ends of the second openings op2 are not regularly disposed adjacent to the data line 130. Accordingly, the disclination, which occurs due to change of the direction of the fringe electric field at the ends of the second openings op2, can be minimized differently from the array substrate 1 of FIG. 1 for the related art transflective LCD device, where the ends of the second openings op2 are spaced apart from and regularly disposed adjacent to the data line 30 of FIG. 1. Moreover, the ends of the second openings op2 overlap the gate line 105 or the common line 106, and even though the disclination occurs around the ends of the second openings op2, the disclination can be shielded by the gate line 105 or the common line 106. Furthermore, since the ends of the second openings op2 are not disposed adjacent to the data line 130, all the reflective area RA excluding the data line 130 can be used, and reflection efficiency can be increased. Thus, the aperture ratio can be improved.

According to simulation, in the transflective LCD device of the present invention, the reflection efficiency in the reflective area RA is increased by 13% as compared with the related art, and the contrast ratio is improved by 23% due to the minimized disclination. The pixel electrode 62 in the pixel region P is separated from a pixel electrode in a next pixel region.

Figure 4:
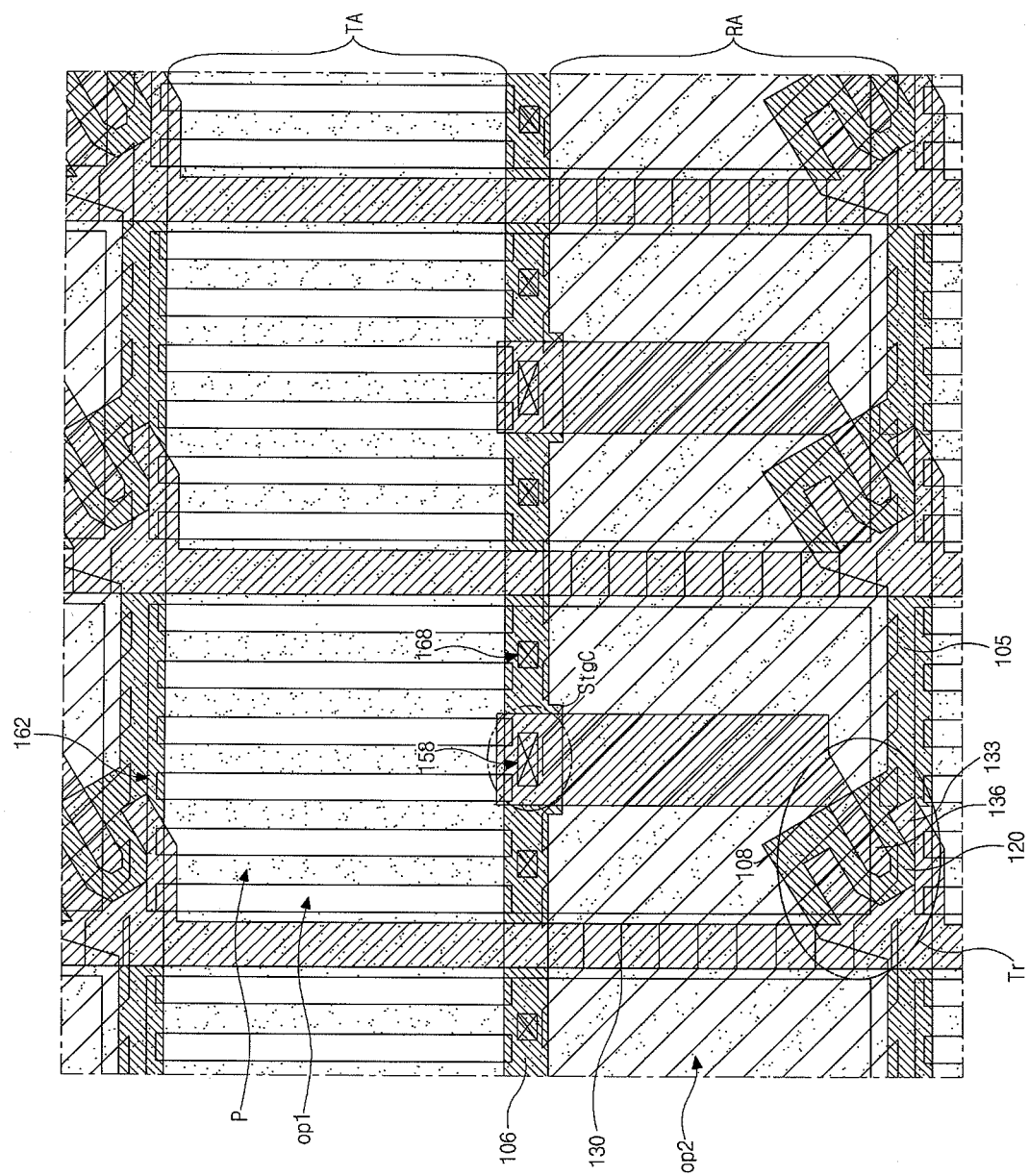
FIG. 4 is a plan view of an array substrate for a transflective LCD device according to another exemplary embodiment of the present invention.

FIG. 4 is a plan view of an array substrate for a transflective LCD device according to another embodiment of the present invention. FIG. 4 shows two pixel regions. The array substrate of FIG. 4 includes the same parts as that of FIG. 3 except for the second openings op2. Explanation for the same parts will be omitted.

In FIG. 4, the second openings op2 corresponding to the reflective area RA are formed aslant at a predetermined angle with respect to the data line 130, beneficially, at an angle of 30 degrees to 60 degrees. Parts of the second openings op2 overlapping the data line 130 are parallel to the gate line 105. Some of the second openings op2 may be disposed in the reflective areas RA of the adjacent pixel regions P. One ends of the second openings op2 overlap the common line 106, and the other ends of the second openings op2 overlap the gate line 106.

Hereinafter, a cross-sectional structure of an array substrate for a transflective LCD device according to the present invention will be described with reference to an accompanying drawing. The array substrates of FIG. 3 and FIG. 4 may have the same cross-sectional structure.

Figure 5:
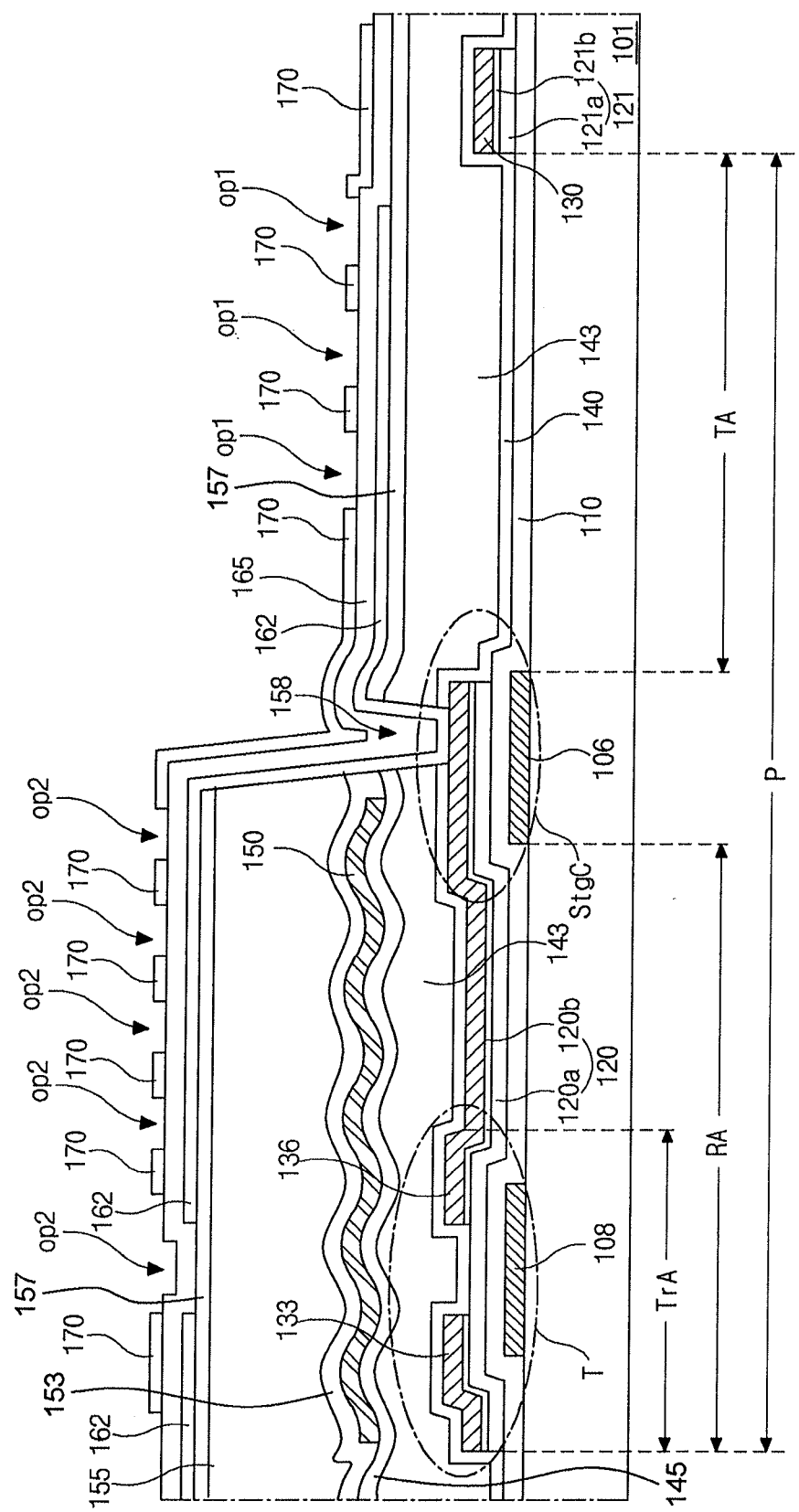
FIG. 5 is a cross-sectional view of an array substrate for a transflective LCD device according to the present invention and corresponds to the line V-V of FIG. 3.

FIG. 5 is a cross-sectional view of an array substrate for a transflective LCD device according to the present invention and corresponds to the line V-V of FIG. 3.

In FIG. 5, a pixel region P including a switching region TrA, where a thin film transistor will be formed, is defined.

A gate line (not shown), a common line 106 and a gate electrode 108 are formed on an insulating substrate 101. The gate line extends along a first direction. The common line 106 is parallel to the gate line. The gate electrode 108 is disposed in the switching region TrA and is connected to the gate line. A gate insulating layer 110 is formed on the gate line and the gate electrode 108. The gate insulating layer 110 may be formed of an inorganic insulating material, for example, silicon oxide ($SiO_2$) or silicon nitride (SiNx).

A data line 130 is formed on the gate insulating layer 110. The data line 130 crosses the gate line to define the pixel region P. An active layer 120a, ohmic contact layers 120b, and source and drain electrodes 133 and 136 are sequentially formed in the switching region TrA. The active layer 120a is formed of intrinsic amorphous silicon and is disposed on the gate insulating layer 110 over the gate electrode 108. The ohmic contact layers 120b are formed of impurity-doped amorphous silicon and are spaced apart from each other over the active layer 120a. The source and drain electrodes 133 and 136 are spaced apart from each other over the ohmic contact layers 120b. The source electrode 133 is connected to the data line 130. The gate electrode 108, the gate insulating layer 110, the active layer 120a, the ohmic contact layers 120b, and the source and drain electrodes 133 and 136 constitute the thin film transistor Tr.

A semiconductor pattern 121 is formed under the data line 130. The semiconductor pattern 121 includes a first pattern 121a and a second pattern 121b, which are formed of the same materials as the active layer 120a and the ohmic contact layers 120b. The semiconductor pattern 121 may be omitted.

A first passivation layer 140 is formed on the data line 130 and the thin film transistor Tr. The first passivation layer 140 may be formed of an inorganic insulating material such as silicon oxide ($SiO_2$) or silicon nitride (SiNx). A second passivation layer 143 is formed on the first passivation layer 140. The second passivation layer 143 may be formed of an organic insulating material, for example, photo acryl or benzocyclobutene (BCB). The second passivation layer 143 has an uneven top surface in the reflective area RA and a flat top surface in the transmissive area TA.

A reflective layer 150 is formed in the reflective area RA on the second passivation layer 143. The reflective layer 150 may be formed of a metallic material having relatively high reflectivity, for example, aluminum (Al) or aluminum alloy (AlNd).

The reflective layer 150 has an uneven surface due to the uneven top surface of the second passivation layer 143. The reflective layer 150 extends into the switching region TrA and covers the thin film transistor Tr to thereby block light incident to a channel of the thin film transistor Tr.

A third passivation layer 145 of an inorganic insulating material, for example, silicon oxide ($SiO_2$) or silicon nitride (SiNx), may be further formed between the second passivation layer 143 and the reflective layer 150 in the reflective area RA to improve contact properties therebetween.

A fourth passivation layer 155 is formed on the reflective layer 150 in the reflective area RA. The fourth passivation layer 155 may be formed of an organic insulating material such as photo acryl. The fourth passivation layer 155 has a flat top surface. The fourth passivation layer 155 forms a step between the transmissive area TA and the reflective area RA to make different thicknesses of a liquid crystal layer (not show) in the transmissive area TA and the reflective area RA of the LCD device. More particularly, in the reflective area RA, light incident on the reflective layer 150 from the outside is reflected by the reflective layer 150, and then the user sees the reflected light. Therefore, the light passes through the liquid crystal layer two times. On the other hand, in the transmissive area TA, light from a backlight unit (not shown) passes through the liquid crystal layer one time, and the user sees the light. Accordingly, there is a phase difference between the transmissive area TA and the reflective area RA. To solve the phase difference between the transmissive area TA and the reflective area RA, the thickness of the liquid crystal layer in the transmissive area TA should be double of the thickness of the liquid crystal layer in the reflective area RA. To do this, the fourth passivation layer 155 is formed in the reflective area RA.

Additionally, the fourth passivation layer 155 prevents the unevenness of the reflective layer 150 from being applied to upper elements. The fourth passivation layer 155 of the organic insulating material has a relatively thick thickness to overcome the unevenness of the reflective layer 150, and the top surface of the fourth passivation layer 155 is flat.

The fourth passivation layer 155 and the second passivation layer 143 have a drain contact hole 158 exposing the drain electrode 136, which overlaps the common line 106.

A fifth passivation layer 153 of an inorganic insulating material, for example, silicon oxide ($SiO_2$) or silicon nitride (SiNx), may be further formed between the fourth passivation layer 155 and the reflective layer 150 to improve contact properties therebetween.

Next, a pixel electrode 162 is formed on the fourth passivation layer 155 in the reflective area RA and on the second passivation layer 143 in the transmissive area TA. The pixel electrode 162 has a plate shape. The pixel electrode 162 is separated by the pixel region P and is connected to the drain electrode 136 through the drain contact hole 158. The pixel electrode 162 may be formed of a transparent conductive material such as indium tin oxide (ITO) or indium zinc oxide (IZO).

Here, a sixth passivation layer 157 of an inorganic insulating material, for example, silicon oxide ($SiO_2$) or silicon nitride (SiNx), may be further formed between the pixel electrode 162 and the fourth passivation layer 155 and between the pixel electrode 162 and the second passivation layer 143. The sixth passivation layer 157 may improve contact properties between the pixel electrode 162 of the transparent conductive material and the second and fourth passivation layers 143 and 155 of the organic insulating material. The contact properties between the organic insulating material and the inorganic insulating material are superior to the contact properties between the organic insulating material and the metallic material, and the contact properties between the metallic material and the inorganic insulating material are also superior to the contact properties between the organic insulating material and the metallic material. When the sixth passivation layer 157 is further formed, the sixth passivation layer 157 is patterned together with the second and fourth passivation layers 143 and 155 to thereby form the drain contact hole 158 exposing the drain electrode.

A seventh passivation layer 165 is formed on the pixel electrode 162 and substantially all over the substrate 101. The seventh passivation layer 165 may be formed of an inorganic insulating material such as silicon oxide ($SiO_2$) or silicon nitride (SiNx).

A common electrode 170 is formed on the seventh passivation layer 165 and substantially all over the substrate 101. The common electrode 170 may be formed of a transparent conductive material. The common electrode 170 has first openings op1 corresponding to the transmissive area TA in the pixel region P and second openings op2 corresponding to the reflective area RA. The first openings op1 corresponding to the transmissive area TA are parallel to the data line 130, and more particularly, a direction of their lengths longer than widths is parallel to the data line 130. The second openings op2 corresponding to the reflective area RA have a length direction aslant at a predetermined angle with respect to the data line 130, and more particularly, the second openings op2 are formed aslant at the predetermined angle with respect to the data line 130 regardless of the pixel regions P adjacent to each other horizontally in the context of the figure. One ends of the second openings op2 overlap the gate line (not shown), and the other ends of the second openings op2 overlap the common line 106. One ends of the first openings op1 overlap another gate line (not shown), and the other ends of the first openings opt overlap the common line 106.

Even though not shown in the figure, the common electrode 170 substantially all over the substrate 101 contacts and is electrically connected to the common line 106 through common contact holes formed in the passivation layers In a transflective LCD device including the above-mentioned array substrate, the disclination due to the ends of the second openings around the data line 130 is minimized, and the reflection efficiency is increased. Further, the contrast ratio in the reflective area RA and the aperture ratio are improved.

As stated above, in the array substrate for a transflective LCD device according to the present invention, the second openings of the common electrode are formed in the common line and the gate line such that ends of the second openings are disposed over the gate line and the common line regardless of the pixel regions. Therefore, the disclination due to the ends of the second openings around the data line can be prevented.

In addition, since there is no disclination around the data line, it is not needed to widen the black matrix for shielding the disclination, and thus the aperture ratio can be increased.

Moreover, because the disclination around the data line is prevented, the reflective area is enlarged, and the reflection efficiency is increased. Furthermore, the contrast ratio is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display device, comprising:

a substrate;

first and second gate lines on the substrate along a first direction;

a common line parallel to and between the first and second gate lines;

a gate electrode connected to the first gate line;

a gate insulating layer on the first and second gate lines, the gate electrode and the common line;

a data line over the gate insulating layer and along a second direction, the data line crossing the first and second gate lines to define a pixel region, the pixel region divided into a transmissive area and a reflective area by the common line;

a semiconductor layer on the gate insulating layer over the gate electrode;

source and drain electrodes over the semiconductor layer and spaced apart each other;

a first passivation layer over the data line, the source electrode and the drain electrode substantially all over the substrate;

a reflective layer over the first passivation layer in the reflective area;

a second passivation layer over the reflective layer and having a flat top surface in the reflective layer;

a pixel electrode over the first and second passivation layers and connected to the drain electrode through a drain contact hole, the pixel electrode having a plate shape;

a third passivation layer over the pixel electrode; and a common electrode over the third passivation layer substantially all over the substrate, the common electrode having first openings and second openings corresponding to the transmissive area and the reflective area, respectively, wherein the first openings are spaced apart from each other and are parallel to the data line, and the second openings are spaced apart from each other and are slant an a predetermined angle with respect to the data line, wherein first ends of the first openings overlap the second gate line, second ends of the first openings overlap the common line, first ends of the second openings overlap the common line, and second ends of the second openings overlap the first gate line.

2. The array substrate according to claim 1, wherein the second openings extend into a next pixel region adjacent to the pixel region along the first direction.

3. The array substrate according to claim 1, wherein the drain contact hole is formed in the first and second passivation layers.

4. The array substrate according to claim 1, wherein the first passivation layer has an uneven top surface in the reflective area and a flat top surface in the transmissive area, and the reflective layer has an uneven surface.

5. The array substrate according to claim 1, wherein the source electrode is connected to the data line, and the drain electrode overlaps the common line across the reflective area to form a storage capacitor.

6. The array substrate according to claim 1, further comprising a fourth passivation layer of an inorganic insulating material between the first passivation layer and the source and drain electrodes substantially all over the substrate.

7. The array substrate according to claim 6, further comprising a fifth passivation layer of an inorganic insulating material between the first passivation layer and the reflective layer in the reflective area.

8. The array substrate according to claim 7, further comprising a sixth passivation layer of an inorganic insulating material between the reflective layer and the second passivation layer in the reflective area.

9. The array substrate according to claim 8, further comprising a seventh passivation layer of an inorganic insulating material between the second passivation layer and the pixel electrode.

10. The array substrate according to claim 1, wherein the first and second passivation layers are formed of an organic insulating material.

11. The array substrate according to claim 1, wherein the predetermined angle is within a range of 30 to 60 degrees.

* * * * *